United States Patent
Song

(10) Patent No.: US 8,142,893 B2
(45) Date of Patent: Mar. 27, 2012

(54) POLYMERIC FILMS

(75) Inventor: Kwangjin Song, Pittsford, NY (US)

(73) Assignee: Exxonmobil Oil Corporation, Irving, TX (US)

( * ) Notice: Subject to any disclaimer, the term of this patent is extended or adjusted under 35 U.S.C. 154(b) by 1131 days.

(21) Appl. No.: 11/141,236

(22) Filed: May 31, 2005

(65) Prior Publication Data

US 2006/0269755 A1    Nov. 30, 2006

(51) Int. Cl.
B32B 9/04 (2006.01)

(52) U.S. Cl. .................. 428/411.1; 428/304.4; 428/480; 428/343; 428/354; 428/353; 428/318.4; 206/527

(58) Field of Classification Search .................. None
See application file for complete search history.

(56) References Cited

U.S. PATENT DOCUMENTS

| | | | |
|---|---|---|---|
| 2,736,066 A | | 2/1956 | Chren et al. |
| 3,380,868 A | | 4/1968 | Moser |
| 4,657,954 A | * | 4/1987 | Watanabe et al. ............. 523/459 |
| 4,741,957 A | | 5/1988 | Park |
| 4,837,254 A | | 6/1989 | Branscome |
| 4,853,602 A | | 8/1989 | Hommes et al. |
| 5,134,218 A | | 7/1992 | Brennan et al. |
| 5,275,853 A | | 1/1994 | Silvis et al. |
| 5,324,467 A | | 6/1994 | Anderson, II |
| 5,428,086 A | | 6/1995 | Minnick et al. |
| 5,451,626 A | | 9/1995 | Kumaki et al. |
| 5,470,643 A | | 11/1995 | Dorfman |
| 5,637,366 A | | 6/1997 | Davis et al. |
| 5,885,721 A | | 3/1999 | Su et al. |
| 6,027,776 A | | 2/2000 | Mueller |
| 6,165,610 A | | 12/2000 | Moore et al. |
| 6,168,826 B1 | | 1/2001 | Su et al. |
| 6,210,524 B1 | * | 4/2001 | Josephy ........................ 156/344 |
| 6,221,191 B1 | | 4/2001 | Davis et al. |
| 6,472,081 B1 | | 10/2002 | Tsai et al. |
| 6,663,974 B2 | | 12/2003 | Kelch et al. |
| 2002/0009605 A1 | | 1/2002 | Davis et al. |
| 2002/0012781 A1 | * | 1/2002 | Beer et al. ..................... 428/220 |
| 2003/0104218 A1 | | 6/2003 | Tsai et al. |
| 2004/0013862 A1 | | 1/2004 | Brebion et al. |

FOREIGN PATENT DOCUMENTS

| | | |
|---|---|---|
| EP | 220 619 B1 | 9/1991 |
| EP | 220 620 B1 | 9/1991 |
| EP | 220 621 B1 | 9/1991 |

OTHER PUBLICATIONS

"Polyester Resin Composition and Its Use", Derwent Abstract of JP 01-1318063, Dec. 22, 1989.*
Hashimoto et al., Polyester Resin Composition and Its Application, English Translation of JP 01-318063, Dec. 22, 1989.*
Brennan et al., *Macromolecules*, vol. 28, pp. 6694-6696, American Chemical Society (1995).
Coleman et al., *Macromolecules*, vol. 25, pp. 4414-4424, American Chemical Society (1992).

* cited by examiner

*Primary Examiner* — Alicia Chevalier
*Assistant Examiner* — Anish Desai
(74) *Attorney, Agent, or Firm* — Robert L. Abdon; Darryl M. Tyus; Rick F. James

(57) ABSTRACT

Multi-layer polymeric films having at least one skin layer comprising at least one polyhydroxyether component or a combination of at least one polyhydroxyether component and at least polyester component are provided. The multi-layer films exhibit advantages such as high surface energy contributing to improved printability, barrier properties, and metallization. Additionally, the films exhibit improved adhesion between the skin layer and other layers of multi-layer film structures. In certain embodiments, the at least one skin layer incorporates from about 70 wt. % to about 100 wt. % of the at least one polyhydroxyether component or the combination of the at least one polyhydroxyether component and the at least one polyester component. The combination of the at least one polyhydroxyether component and the at least one polyester component incorporates from about 1 wt. % to about 99.0 wt. % of the at least one polyhydroxyether component and from about 1 wt. % to about 99 wt. % of the at least one polyester component.

24 Claims, No Drawings

POLYMERIC FILMS

FIELD OF THE INVENTION

This disclosure relates to multiple layer polymeric films including at least one skin layer incorporating at least one polyhydroxyether component or a combination of a polyhydroxyether component and a polyester component.

BACKGROUND OF THE INVENTION

Films with skin layers incorporating polyesters are known. Such films are widely used in the packaging industry. Generally, the polyester skin layers are inexpensive, clear, offer high surface energy, and are stable in orientation processes.

U.S. Pat. No. 5,324,467 to Anderson describes coextrusion or extrusion coating processes for the preparation of an oriented multi-layer laminate film, consisting of at least three layers, including a polypropylene layer, an adhesive layer of polar modified polyolefin, and a glycol or acid modified copolyester layer. The multi-layer film is prepared by uniaxially or biaxially stretching castings. It is disclosed that the film has good heat sealability and high gas barrier.

U.S. Pat. No. 5,637,366 to Davis, et al. and U.S. Pat. No. 6,221,191 to Davis, et al. disclose biaxially oriented polypropylene core layer films with multiple layer film cap layers. The cap layer is laminated or coated onto the core layer. The cap layer includes at least one polyester layer and at least one tie layer interposed between the polyester layer and the PP core. The cap layer is provided on a machine direction oriented uniaxially oriented polypropylene core layer. The resulting composite is stretched in a transverse direction.

U.S. Pat. No. 6,472,081 to Tsai, et al. discloses an oriented multi-layer film combination including a propylene homopolymer or copolymer core layer, a metallizable skin layer including a material selected from an ethylene-vinyl alcohol copolymer (EVOH), poly(vinyl alcohol) (PVOH), and polyester. An adhesive tie layer made from a material selected from a maleic anhydride modified propylene homopolymer or copolymer, a high density polyethylene (HDPE), and an ethylene-vinyl acetate (EVA) copolymer. The adhesive tie layer is disposed between the core layer and the skin layer.

U.S. Pat. No. 6,027,776 to Mueller discloses a multi-layer film incorporating an interior layer of ethylene/alpha-olefin copolymer; a first exterior layer of a material selected from a propylene homopolymer or copolymer, a propylene homopolymer or copolymer blended with an elastomer, HDPE, and a copolyester. A second exterior layer includes a material selected from a polyamide, a copolyamide, polyester, copolyester, HDPE, PP, propylene/ethylene copolymer, and polycarbonate. A first adhesive layer is provided between the interior layer and the first exterior layer while a second adhesive layer is provided between the interior layer and the second exterior layer. The adhesive layers are anhydride-modified ethylene/methyl acrylate copolymers. It is disclosed that this film is used to produce flexible pouches for the packaging and administration of medical solutions.

U.S. Pat. No. 6,663,974 to Kelch, et al. discloses a non-oriented multi-layer film with a polyolefin core incorporating 40 wt. % or less of homogeneous ethylene/alpha-olefin. A modified polyolefin tie layer is provided on each side of the core layer with an adhesive layer on at least one tie layer. The adhesive layer contains a polar-modified polyolefin and a polyester, copolyester, or polyester and copolyester blend. It is disclosed that this multi-layer film has utility as a protective coating for metal surface.

BRIEF DESCRIPTION OF THE INVENTION

This disclosure relates to multi-layer polymeric films having at least one skin layer comprising at least one polyhydroxyether component or a combination of at least one polyhydroxyether component and at least one polyester component. The multi-layer films exhibit advantages such as high surface energies contributing to improved printability, coatability, sealability, barrier properties, and metallization. Additionally, the films described herein exhibit improved adhesion between the skin layer and an adjacent layer of multi-layer film structures.

In certain embodiments, the at least one skin layer incorporates from about 70 wt. % to about 100 wt. % of the at least one polyhydroxyether component or the combination of the at least one polyhydroxyether component and the at least one polyester component. Additionally, in certain embodiments, the combination of the at least one polyhydroxyether component and the at least one polyester component incorporates from about 1 wt. % to about 99.0 wt. % of the at least one polyhydroxyether component and from about 1 wt. % to about 99 wt. % of the at least one polyester component.

The at least one skin layer may be adhered directly to an adjacent functional film layer or adhered to an adjacent functional film layer through the use of an adhesive tie layer. Adhesion between the skin layer and the functional layer or the tie layer is improved as compared to adhesion typically exhibited between conventional skin layers and adjacent film layers. The at least one skin layer described herein may also improve processability of films incorporating the skin layer. Conventional polymeric films incorporating skin layers incorporating certain materials, particularly polyesters, have a tendency to stick to heated rollers and other equipment elements used to orient the films. Films including the skin layers incorporating at least one polyhydroxyether component, as described herein, exhibit a reduced tendency to stick to the processing equipment thereby leading to better gauge control and optics of the polymeric films described herein. The presence of the at least one polyhydroxyether component in the skin layer may disrupt stress localization and strain-induced crystallization when the films described herein are produced through biaxial orientation. This disruption may lead to improved optical and gauge uniformity of the films described herein.

DETAILED DESCRIPTION OF THE INVENTION

It is observed that films incorporating certain materials, particularly polyesters, are deficient in interlayer adhesion strength and exhibit a variety of processability problems due to crystalline structures and surface stickiness. For example, polyester containing skin layers generally suffer from poor interlayer adhesion to adjacent tie layers and functional layers of dissimilar materials such as polyolefin based polymers. Additionally, in commercial scale orientation processes, coextruded polyester skin layers often stick to the heated rolls in the machine direction orientation section, thus increasing haze and deteriorating adhesive and optical properties of the film.

Coating processes used in combination with film orientation processes seek to eliminate the sticking in the machine direction orientation section by introducing the polyester skin layer after the machine direction orientation section. However, the polyester skin layer still produces optical and thickness nonuniformity and sticking to equipments such as tenter frame clips during the transverse direction orientation process. Moreover, when the multi-layer film produced by the extrusion coating process is exposed to heat environment during converting or end user application processes, it distorts or curls severely by the presence of uniaxially and biaxially oriented layers in the same film structure.

This disclosure relates to multiple layer polymeric films. The films described herein incorporate at least one skin layer and a film substrate incorporating at least one polymeric film layer. The skin layer exhibits beneficial performance properties while at the same time exhibiting a level of adhesion to the adjacent film substrate sufficient to make the multiple layer film structure useful in a wide variety of applications. For example, the films described herein are useful for producing packages and label structures.

The at least one skin layer incorporates at least one polyhydroxyether component or a combination of at least one polyhydroxyether component and at least one polyester component. It has been found that such skin layers may exhibit many, if not all, of the advantages associated with conventional polyester skin layers, such as barrier properties and high surface energies that contribute to improved printability, coatability, sealability, and metallization of the skin layers. Moreover, the at least one skin layer exhibits adhesion to an adjacent film substrate at levels superior to conventional polyester skin layers. For example, in certain embodiments of the films described herein, the at least one skin layer exhibits a peel strength, measured by a TMI slip/peel tester at the 180° angle tensile testing mode, to an adjacent layer that may be a core layer or a tie layer, that is greater than 40.0 g/cm. In other embodiments, the peel strength is greater than 50.0 g/cm. In still other embodiments, the peel strength is greater than 60.0 g/cm. In additional embodiments, the peel strength is greater than 70.0 g/cm.

The at least one skin layer may be incorporated into multi-layer film structures having a wide variety of additional layers, including the film layer adjacent to the skin layer.

In certain embodiments, the at least one skin layer incorporates from about 70 wt. % to about 100 wt. % of at least one polyhydroxyether component or a combination of at least one polyhydroxyether component and at least one polyester component. In other embodiments, the at least one skin layer incorporates from about 80 wt. % to about 100 wt. % of at least one polyhydroxyether component or a combination of at least one polyhydroxyether component and at least one polyester component. In still other embodiments, the at least one skin layer incorporates from about 90 wt. % to about 100 wt. % of at least one polyhydroxyether component or a combination of at least one polyhydroxyether component and at least one polyester component.

In turn, in certain embodiments, the combination of the at least one polyhydroxyether component and the at least one polyester component incorporates from about 1 wt. % to about 99 wt. % of the at least one polyhydroxyether component and about 1 wt. % to about 99 wt. % of the at least one polyester component. In additional embodiments, the combination of the at least one polyhydroxyether component and the at least one polyester component incorporates from about 1 wt. % to about 50 wt. % of the at least one polyhydroxyether component and about 50 wt. % to about 99 wt. % of the at least one polyester component. In other embodiments, the combination of at the least one polyhydroxyether component and the at least one polyester component incorporates from about 1 wt. % to about 30 wt. % of the at least one polyhydroxyether component and about 70 wt. % to about 99 wt. % of the at least one polyester component. In still other embodiments, the combination of at the least one polyhydroxyether component and the at least one polyester component incorporates from about 5 wt. % to about 20 wt. % of the at least one polyhydroxyether component and about 80 wt. % to about 95 wt. % of the at least one polyester component.

In certain embodiments, the at least one skin layer described herein may have a thickness of about 0.1 μm to about 25 μm. In other embodiments, the at least one skin layer described herein may have a thickness of about 0.2 μm to about 15 μm. In additional embodiments, the at least one skin layer described herein may have a thickness of about 0.2 μm to about 5 μm.

The at least one polyester component for use in the at least one skin layer described herein may be selected from a wide variety of polyesters and blends thereof. Exemplary suitable polyesters for selection as the at least one polyester include homopolyesters, copolyesters, and blends thereof. Specific exemplary homopolyesters include poly(ethylene terephthalate) (PET), poly(trimethylene terephthalate) (PTMT), poly(butylene terephthalate) (PBT), poly(ethylene naphthalate) (PEN), polylactic acid (PLA), polycarbonate (PC), poly(1,4-cyclohexylenedimethylene terephthlate) (PCT), polyester base liquid crystalline polymers (LCP), and blends thereof. In certain embodiments, the polyester is selected from PET, PLA, PEN, and blends thereof. In other embodiments, the polyester is selected from PET, PLA, and blends thereof. In still other embodiments, the polyester is PET.

Exemplary suitable copolyesters for selection as the at least one polyester component include glycol or acid modified polyesters having at least three different monomeric units. Specific exemplary copolyesters are copolyesters of terephthalic acid (TPA), ethylene glycol (EG), and 1,4-cyclohexylenedimethylene (CHDM), poly(ethylene terephthalate glycol) (PETG), copolyesters of isophthalic (IPA) and terephthalic acids (TPA), diethylene glycol (DEG), EG and CHDM, copolyesters of bisphenol-A of IPA and TPA (polyarylate), copolyesters of IPA, TPA, EG and butane diol, and blends thereof. In certain embodiments, the copolyester is selected from copolyesters of terephthalic acid (TPA), ethylene glycol (EG), and 1,4-cyclohexylenedimethylene (CHDM), PETG, copolyesters of isophthalic (IPA) and terephthalic acids (TPA), diethylene glycol (DEG), EG and CHDM, and blends thereof. In other embodiments, the polyester is selected from terephthalic acid (TPA), ethylene glycol (EG), and 1,4-cyclohexylenedimethylene (CHDM), PETG, and blends thereof. In still other embodiments, the polyester is PETG.

Suitable exemplary commercially available polyesters include PET homopolymer VORIDIAN® from Eastman Chemical Company and RYNITE® from E.I. du Pont de Nemours and Company, PTMT homopolymer CORTERRA® from Shell Chemical, PBT homopolymer VALOX® from GE plastics and CRASTIN® from E.I. du Pont de Nemours and Company, PLA homopolymer PLA POLYMER from Cargill Dow LLC, PEN homopolymer TEONEX® from Teijin Corporation, PC homopolymer LEXAN® from GE Plastics, polyester base LCP VECTRA® and VECTRAN® from Ticona Engineering Polymers, PCT homopolymer THERMIX® from E.I. du Pont de Nemours and Company, and copolyester EASTAR® and EMBRACE® from Eastman Chemical Company and CRYSTAR® from E.I. du Pont de Nemours and Company.

The polyhydroxyether component may be selected from a wide variety of polyhydroxyethers and combinations thereof. Polyhydroxyethers have pendant hydroxyl moieties and aromatic ether moieties in the repeating unit. In certain embodiments, the polyhydroxyethers include poly(hydroxyl amino ether), poly(hydroxyl amide ether), poly(hydroxyl ether of Bisphenol A) ("phenoxy"), and blends thereof. Other suitable polyhydroxyethers include poly(hydroxyl amino ether) containing a tertiary amine unit, which participates in hydrogen-bonding interaction and poly(hydroxyl amide ether) containing two amide groups as part of the polymer repeat unit. The synthetic routes and further examples of suitable polyhydroxyethers are disclosed in U.S. Pat. No. 5,134,218 to Brennan, et al. and U.S. Pat. No. 5,275,853 to Silvis, et al.

Exemplary suitable phenoxides may have a molecular weight (MW) of 15,000 to 55,000 g/mol, a degree of polymerization (n) is about 50 to 300, a melt index at 220° C. (428° F.) and 2.16 kg of 0.5 g/10 min to 5.0 g/10 min, and a volatile content of 0.01 wt. % to 3.0 wt. % as determined at 220° C. (428° F.) for 1 hour.

Exemplary suitable polyhydroxyethers are poly(hydroxyl amino ether) and poly(hydroxyl amide ether) that are commercially available from Dow Chemical Company under the designation BLOX®. They may have a melt index of 0.25 g/10 min to 20 g/10 min at 190° C. (374° F.) and 2.16 kg and a volatile content 0.01 wt. % to 5.0 wt. % as determined at 220° C. (428° F.) for 1 hour. In certain embodiments, the resins may have a low melt index below 5.0 g/10 min and a low volatile content below 2.0 wt. % as determined at 220° C. (428° F.) for 1 hour.

As discussed in Brennan et al., *Macromolecules,* 28, 6694, (1995), the hydroxyl and amide (or amine) groups in polyhydroxyethers are two of the most important contributors to a high gas barrier and a high adhesive reactivity in polymers. The m-phenylene units in poly(hydroxyl amino ether) and poly(hydroxyl amide ether) are also preferred for a low gas permeability and a high adhesive reactivity. Polymers that contain the m-phenylene backbone segment have lower oxygen transmission and better adhesion than their p-phenylene counterparts. The "kinked" structure of polymers containing the 1,3-phenylene unit allows their backbones to adopt more preferential chain conformations for enhanced packaging efficiency than backbones dominated by more rigid p-phenylene segments.

As discussed in Coleman et al., *Macromolecules,* 25, 4414, (1992), the polyhydroxyether is generally miscible with the polyester at the molecular level through intermolecular π-electron interaction as well as ester exchange reactions between the pendant hydroxyl groups of the polyhydroxyether and the ester linkages of the polyester. Therefore, polyhydroxyethers do not form particles or isolated regions when the at least one polyhydroxyether component and the at least one polyester component are blended. For this reason, when a combination of a polyhydroxyether component and a polyester component are used to produce skin layers in film structures produced in orientation processes, the polyhydroxyethers typically will not create voids in the skin layer.

The at least one polyhydroxyether component and the at least one polyester component may be combined by blending or compounding the at least one polyhydroxyether and the at least one polyester. In certain embodiments, the blends are produced by blending pellets of the at least one polyhydroxyether and the at least one polyester. Thereafter, the blended pellets may be fed to an extruder for formation of the skin layer. In certain embodiments, the skin layer is coextruded with other layers of adjacent film substrate to which skin layer is adhered.

As discussed above, the at least one skin layer produced as described herein exhibits improved adhesion to the adjacent film substrate. In certain embodiments, the adjacent film substrate incorporates a coextruded polyolefin layer. In other embodiments, the adjacent film substrate to which the at least one skin layer is adhered incorporates an oriented coextruded polypropylene film layer. In still other embodiments, the adjacent film substrate incorporates a coextruded biaxially oriented polypropylene layer.

In general, polyesters have little or no chemical and physical interactions with polyolefin such as polyethylene and polypropylene. Therefore, an adhesive tie layer is typically used to tie together the polyester layer and the polyolefin layer. The adhesive tie resin may include copolymers having ester and olefin segments and functionalized polymers that react chemically with polyesters. Polyester components may also be modified to have more functional groups in order to facilitate adhesion between a film layer incorporating at least one polyester component and an adjacent polyolefin layer.

In other embodiments, as discussed above, the at least one skin layer may be adhered to another functional film layer of the adjacent film substrate through the use of a tie layer incorporating a tie resin. Suitable adhesive tie resins include polar modified polyolefins. Polar modified polyolefins include olefin polymers having a polar monomer copolymerized therein, olefin polymers or copolymers grafted with acids or anhydrides, or derivatives thereof. Exemplary polar modified polyolefins include ethylene copolymers, and their ethylene acrylate copolymers (EA), anhydride-modified EA, acid terpolymers containing ester and acrylic functionalities, polar-modified PP such as maleic anhydride grafted polypropylene (PP-MAH), glycidyl methacrylate modified PP (PP-GMA), random terpolymers of ethylene, acrylic ester and glycidyl methacrylate, and blends thereof. These polymers may include at least one elastomer or polar modified elastomer as a toughener or tougheners, such as ethylene-propylene copolymers (EPM), polar modified EPM such as EPM-MAH, ethylene-butylene copolymers, polar modified ethylene-butylene copolymers, ethylene-octene copolymers, polar modified ethylene-octyne copolymers, styrene-butadiene-styrene copolymers (SBS), polar modified SBS such as SBS-MAH, styrene-ethylene-butylene-styrene copolymers (SEBS), polar modified SEBS such as SEBS-MAH, and blends thereof. The ether linkage and pendant —OH groups of polyhydroxyethers promote wetting and bonding to these polar modified substrates. Therefore, the hydroxyl and carboxyl groups of the skin layer polymers react rapidly with the functional group of the tie resins and provide a secondary intermolecular bond, therefore increasing interlayer adhesion and intermolecular cohesion.

In addition to improved adhesion to adjacent film layers, the at least one skin layer described herein may also improve processability of films incorporating the skin layer. Conventional polymeric films incorporating polyesters have a tendency to stick to rollers and other equipment elements used to process the films. Films including the skin layer incorporating at least one polyhydroxyether and layers incorporating at least one polyhydroxyether and at least one polyester exhibit a reduced tendency to stick to such processing equipment thereby leading to better gauge control and optics of the polymeric films described herein. The presence of the at least one polyhydroxyether in the skin layer may also disrupt stress localization and strain-induced crystallization when the films described herein are produced through biaxial orientation. This disruption may lead to improved optical and gauge uniformity of the films described herein.

The polymeric substrates to which the at least one skin layer is adjacent may be any single or multi-layer polymeric material that can be formed into a film. The substrate can be clear or opaque. Additionally, the substrate may be colored or have a matte finish. The opacity of opaque films may be achieved by cavitating, creating voids, in one or more layers of the polymeric film substrate or by other means. For example, cavitation may be achieved through the use of organic or inorganic voiding agents or though production techniques independent of the use of voiding agents. Exemplary thermoplastic materials for use in the single and multiple film layers include any polyolefin such as polypropylene, polyethylene, polybutene, polystyrene, polyvinyl chloride, ethylene containing copolymers such as ethylene-propylene copolymers, ethylene containing terpolymers such as ethylene-propylene-butene terpolymers, polar modified polyolefin, and blends thereof. Other suitable film materials include polyesters, including but not limited to homopolyesters, copolyesters, polyester based LCP, polyamide including oriented nylon, ethylene-vinyl alcohol copolymer (EVOH), and blends thereof. In still other embodiments, the polymeric material selected from the group of propylene homopolymers, propylene copolymers, ethylene homopolymers, ethylene copolymers, polar modified polyolefins, polyesters, polyamides, polystyrenes, ethylene-vinyl alcohol copolymers, and blends thereof. In certain embodiments, the polymeric material for a core layer is selected from a polymeric material selected from propylene homopolymers, propylene copolymers, and blends thereof.

In films structures having three or more layers, a skin layer opposite the skin layer incorporating the at least one polyhydroxyether or the at least one polyhydroxyether and the at least one polyester may be provided. Exemplary opposite skin layers comprise polyethylene, including medium and high-density polyethylene, polypropylene, copolymers of propylene, and ethylene and terpolymers of propylene, ethylene and butylene, and blends thereof. In certain embodiments, the polymeric substrate includes a second skin layer opposite the first skin layer comprising a polymeric material selected from propylene homopolymers, propylene copolymers, ethylene homopolymers, ethylene copolymers, ethylene/propylene/butene terpolymers, polar modified polyolefins, and blends thereof.

The various layers of the multiple layer film structures described herein may incorporate processing aids or inorganic particulates such as titanium dioxide or void initiating agents to enhance the whiteness or color of the substrate or to enhance anti-blocking properties. Exemplary void initiators and techniques are disclosed in U.S. Pat. No. 5,885,721 to Su et al. and U.S. Pat. No. 6,168,826 to Su et al. Exemplary additional additives are slip, anti-block, and anti-static agents that are well known in the art and used to improve substrate functionality and properties. Additionally, as mentioned previously, the substrate may be metallized.

The film structures described herein include a film substrate incorporating at least one polymeric layer having a first surface and a second surface and at least one skin layer as described above. The substrate may incorporate single or multiple film layers. For example, the multi-layer film may be a 3-layer structure with the substrate being a 2-layer polymeric film that comprises a core layer having the skin layer adjacent to a first surface of the core layer and an outer layer opposite the skin layer adjacent to the second surface of the core layer. In such embodiments, the core layer may comprise polypropylene, polyethylene, polar modified polyolefins, and blends thereof. In other embodiments, the film structure may be a 4-layer structure with the substrate being a 3-layer polymeric film which comprises an adhesive tie layer imposed between the skin layer and the first surface of the core layer and an outer layer adjacent to the second surface of the core layer. In certain of these embodiments, the core layer may comprise polypropylene, polyethylene, and blends thereof. In other embodiments, the film structure may be a 5-layer structure with the substrate being a 4-layer polymeric film which comprises a core layer, two intermediate layers adjacent to the central core layer, and with the skin layer adjacent to a first intermediate layer and an outer layer adjacent to a second intermediate layer. In certain of these embodiments, the intermediate layer adjacent to the skin layer may comprise polar modified polyolefins and the core layer may comprise polypropylene.

In certain embodiments, the multiple layer film structures described herein may incorporate two skin layers incorporating the at least one polyhydroxyether component or a combination of at least one polyhydroxyether component and the at least one polyester component, as described herein. Such films may be particularly useful in applications requiring printing, coating, sealing, lamination, or metallization on both sides at the same time. The two skin layers may have the same or different application such as printing on one side and coating on the other side.

A particular type of thermoplastic film which can be advantageously used in the substrate of the film structures described herein is molecularly oriented isotactic polypropylene. After extrusion of the substrate, for example, utilizing conventional extrusion techniques, the film is heated and molecularly oriented by stretching it in both the longitudinal and transverse directions. The resulting oriented film exhibits greatly improved tensile and stiffness properties. Typically polyolefin resins, such as polypropylene, are extruded through a flat sheet extruder die at a temperature ranging from between about 200° C. (392° F.) to about 260° C. (500° F.), casting the film onto a cooling drum and quenching the film. The sheet is then stretched about 3 times to about 7 times in the machine direction (MD) orienter followed by stretching about 5 times to about 10 times in the transverse direction (TD) orienter. For additional details regarding biaxially oriented film processes, see U.S. Pat. No. 3,380,868 to Moser and U.S. Pat. No. 2,736,066 to Chren.

The film structures in accordance with this disclosure may be oriented or hot-blown films made from any of a number of processes. The oriented films may be manufactured in a variety of processes including biaxial orientation, machine direction orientation (MDO), double bubble, simultaneous longitudinal and transverse orientation (LISIM®), tape bubble, trapped bubble or tenter framing. The use of linear motors to directly propel tenter clips to effect simultaneous longitudinal and transverse orientation is disclosed in U.S. Pat. No. 4,853,602 to Hommes et al. Hot-blown films are typically manufactured in a simple bubble process.

Experimental Evaluations

Films incorporating skin layers as described herein were produced and the performance of the films was evaluated in a series of experimental evaluations. In these evaluations, 5-layer film structures were prepared with a 1.0 µm skin layer on one surface of the films. A comparative film was prepared with the skin layer incorporating a copolyester PETG commercially available from Eastman Chemical under the designation EASTAR® 6763. The skin layers of the exemplary film structures in accordance with this disclosure incorporated a blend of PETG and a poly(hydroxyl ether of Bisphenol A) commercially available from InChem Corp. under the designation Phenoxy PKFE in the weight ratios listed in Table I below. All blends for the skin layers were prepared by blending PETG and PKFE pellets. The skin layers were adjacent to a 2.0 µm tie layer produced from a PP-MAH and commercially available from Mitsui Chemical under the designation Admer® 1179A. The tie layer was adjacent to a 14.0 µm polypropylene core layer produced from a polypropylene homopolymer commercially available from ExxonMobil Chemical Company under the designation PP 4712E2. Adjacent to the opposing surface of the core layer was a 2.0 μm intermediate layer also produced from PP 4712E2. Finally, a 1.0 μm sealant layer produced from an ethylene-propylene-butene terpolymer commercially available from Chisso Petrochemical under the designation XF 7700 was provided adjacent to the intermediate layer. The films were produced by coextruding the various film layers at 260° C. (500° F.) onto a casting drum maintained at 43.3° C. (109.94° F.). The cooled extrudate was then stretched 4.7 times in the machine direction at roller temperatures ($T_{MDO}$) set in a staggered manner: 110° C. (230° F.) for the sealant skin and 98° C. (208.4° F.) to 110° C. (230° F.) for the blend skin (see Table I below). Thereafter, the extrudate was stretched 8 times in the transverse direction at temperatures of about 160° C. (320° F.). The peel strength of resultant films was measured with a TMI slip/peel tester at the 180° angle tensile testing mode. Specimens were 2.54 cm wide and 15.2 cm long. The surface of the blend skin was carefully taped by 2.54 cm wide 3M 610 Scotch® tape to prevent film tear during the peeling test. The blend skin was then delaminated by pulling or snapping the tape on the leading edge. The peel strength was measured subsequently. Oxygen transmission rate was measured at 23° C. (73.4° F.) and 0% RH. The properties of the films are reported in Table I.

TABLE I

| Example | PETG/Phenoxy ratios | $T_{MDO}$ (° C.) | Haze (%) | Peel Strength (g/cm) | OTR (cc/m²/24 hr) |
|---|---|---|---|---|---|
| 1 (Comparative) | 100/0 wt. % | 110/98 | 1.10 | 37.9 | 1660 |
| 2 | 95/5 wt. % | 110/98 | 1.08 | 45.2 | 1550 |
| 3 | 95/5 wt. % | 110/101 | 1.11 | 41.7 | 1603 |
| 4 | 95/5 wt. % | 110/105 | 1.09 | 42.3 | 1696 |
| 5 | 85/15 wt. % | 110/98 | 1.10 | 73.2 | 1243 |
| 6 | 85/15 wt. % | 110/110 | 1.08 | 71.8 | 1299 |
| 7 | 80/20 wt. % | 110/98 | 1.12 | 78.3 | 1350 |
| 8 | 80/20 wt. % | 110/110 | 1.21 | 76.4 | 1420 |

The comparative film having a skin layer incorporating only PETG stuck to machine direction orientation rolls, causing optical defects and scratches on the surface. The film also showed optical nonuniformity, for example, hazy bands, along the machine direction. Sticking was not observed on the machine direction orientation rolls for the films containing phenoxy in the skin layers. $T_{MDO}$ was increased to 110° C. (230° F.) without sticking at phenoxy concentration above 10 wt. %. The same $T_{MDO}$ for both the blend skin layer and the sealant skin layer eliminated film nonuniformity associated with gradient of MD orientation temperature across the thickness direction of the film. Films incorporating the combinations of the at least one polyester and the at least one polyhydroxyether exhibited substantially higher peel strength and lower oxygen transmission rates, with equivalent haze as compared to the comparative film. The film comprising the PETG/PKFE blend skin comprising 15 wt. % phenoxy (Example 5) increased peel strength by about 100% and reduced oxygen transmission by about 25%, as compared to Comparative Example 1.

In certain embodiments, the films described herein have oxygen transmission rates below 1,700 cc/m²/24 hr at 23° C. (73.4° F.) and 0% RH. In other embodiments, the films described herein have oxygen transmission rates below 1,600 cc/m²/24 hr at 23° C. (73.4° F.) and 0% RH. In still other embodiments, the films described herein have oxygen transmission rates below 1,500 cc/m²/24 hr at 23° C. (73.4° F.) and 0% RH.

With respect to the various ranges set forth herein, any upper limit recited may, of course, be combined with any lower limit for selected sub-ranges.

All patents and publications referred to herein are hereby incorporated by reference in their entireties.

Although films and processes for producing the films described herein have been described in detail, it should be understood that various changes, substitutions, and alterations could be made without departing from the spirit and scope of the films and processes described, as defined by the following claims.

What is claimed is:

1. A multilayer polymer film comprising:
   (a) a film substrate comprising a tie layer, said tie layer comprising a tie resin having acid or anhydride functional groups; and
   (b) a first skin layer comprising at least one polyhydroxyether having hydroxyl groups;
   wherein said multilayer polymer film is biaxially oriented, and wherein the peel strength between said first skin layer and said film substrate is greater than 40.0 g/cm.

2. The multilayer polymer film of claim 1, wherein said at least one polyhydroxyether is selected from the group consisting of poly(hydroxyl amino ether), poly(hydroxyl amide ether), poly(hydroxyl ether of Bisphenol A), and blends thereof.

3. The multilayer polymer film of claim 2, wherein said first skin layer further comprises at least one polyester.

4. The multilayer polymer film of claim 3, wherein said at least one polyester is selected from the group consisting of homopolyesters, copolyesters, and blends thereof.

5. The multilayer polymer film of claim 3, wherein said at least one polyhydroxyether is selected from the group consisting of poly(hydroxyl amino ether), poly(hydroxyl amide ether), and blends thereof, said at least one polyester is poly(ethylene terephthalate glycol).

6. The multilayer polymer film of claim 1, wherein said polyhydroxyether comprising about 70 wt. % to about 100 wt. % of said first skin layer.

7. The multilayer polymer film of claim 3, wherein said combination of at least one polyhydroxyether and at least one polyester comprises from about 1 wt. % to about 99 wt. % of said at least one polyhydroxyether and from about 1 wt. % to about 99 wt. % of said at least one polyester.

8. The multilayer polymer film of claim 3, wherein said combination of said at least one polyhydroxyether and at least one polyester comprises from about 1 wt. % to about 30 wt. % of said at least one polyhydroxyether and from about 70 wt. % to about 99 wt. % of said at least one polyester.

9. The multilayer polymer film of claim 3, wherein the oxygen transmission rate of the multilayer polymer film produced is below 1,700 cc/m²/24 hr at 23° C. (73.4° F.) and 0% RH.

10. The multilayer polymer film of claim 1, wherein said film substrate further comprises a first polymeric material selected from the group consisting of propylene homopolymers, propylene copolymers, ethylene homopolymers, ethylene copolymers, polar modified polyolefins, polyesters, polyamides, polystyrenes, ethylene-vinyl alcohol copolymers, and blends thereof.

11. The multilayer polymer film of claim 10, wherein said film substrate further comprises a second polymeric material selected from the group consisting of propylene homopolymers, propylene copolymers, ethylene homopolymers, ethylene copolymers, polar modified polyolefins, polyesters, polyamides, polystyrenes, ethylene-vinyl alcohol copolymers, and blends thereof.

12. The multilayer polymer film of claim 1, wherein said film substrate further comprises a core layer, said core layer comprising propylene homopolymers, propylene copolymers, or blends thereof.

13. The multilayer polymer film of claim 12, wherein said tie layer is disposed between the core layer and the first skin layer.

14. The multilayer polymer film of claim 1, wherein said peel strength is greater than 50.0 g/cm.

15. The multilayer polymer film of claim 1, wherein said film substrate further comprises a second skin layer opposite the first skin layer, the second skin layer comprising a second polymeric material selected from the group consisting of propylene homopolymers, propylene copolymers, ethylene homopolymers, ethylene copolymers, ethylene/propylene/butene terpolymers, polar modified polyolefins, and blends thereof.

16. The multilayer polymer film of claim 1, wherein said multilayer polymer film is opaque.

17. The multilayer polymer film of claim 1, wherein at least one substrate layer is voided.

18. A package comprising said multilayer polymer film of claim 1, wherein said multilayer polymer film is formed into a package.

19. A label comprising said multilayer polymer film of claim 1, wherein said multilayer polymer film is formed into a label.

20. A multilayer polymer film comprising:
(a) a film substrate comprising at least one tie layer, said tie layer comprising a tie resin having acid or anhydride functional groups;
(b) a first skin layer comprising a combination of at least one polyhydroxyether and at least one polyester, said polyhydroxyether having hydroxyl groups, wherein said at least one polyhydroxyether is selected from the group consisting of poly(hydroxyl amino ether), poly(hydroxyl amide ether), and blends thereof;

wherein said multilayer polymer film is biaxially oriented, wherein the peel strength between said first skin layer and said film substrate is greater than 40.0 g/cm; and whereby the oxygen transmission rate of the multilayer polymer film produced is below 1,700 cc/m$^2$/24 hr at 23° C. (73.4° F.) and 0% RH.

21. The multilayer polymer film of claim 20, wherein at least one polyester is poly(ethylene terephthalate glycol).

22. The multilayer polymer film of claim 20, wherein said combination of at least one polyhydroxyether and at least one polyester comprises from about 1 wt. % to about 99 wt. % of said at least one polyhydroxyether and from about 1 wt. % to about 99 wt. % of said at least one polyester.

23. A package comprising said multilayer polymer film of claim 20, said multilayer polymer film is formed into a package.

24. A label comprising said multilayer polymer film of claim 20, said multilayer polymer film is formed into a label.

* * * * *